May 16, 1944.  W. F. GROENE ET AL  2,348,973
SPINDLE CONTROL MECHANISM
Filed April 3, 1941
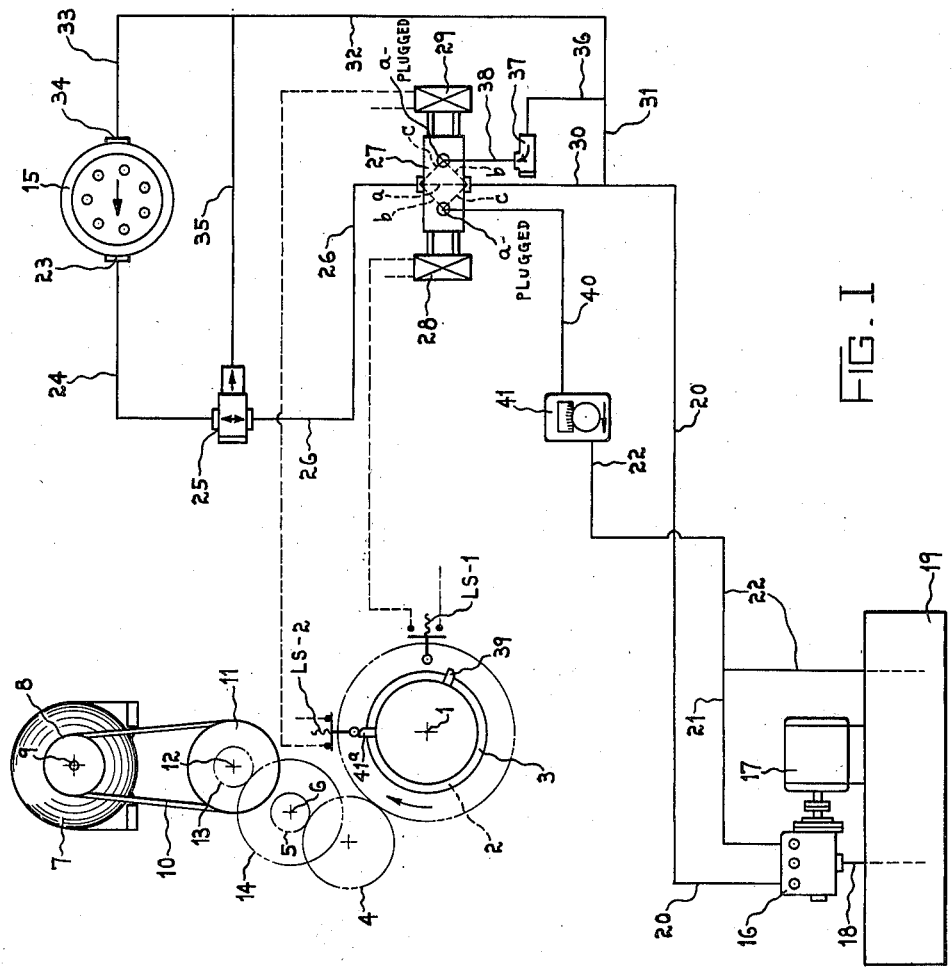
FIG. I
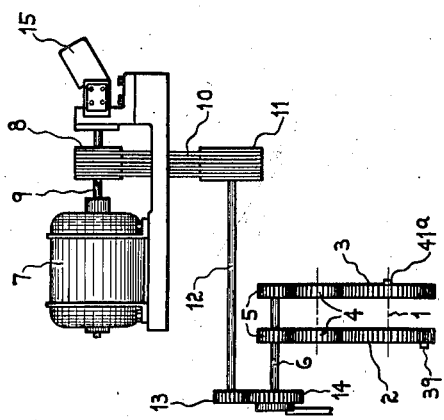
FIG. II
INVENTORS.
WILLIAM F. GROENE
HAROLD J. SIEKMANN
BY Willard S. Groene Patented May 16, 1944

2,348,973

UNITED STATES PATENT OFFICE 2,348,973

SPINDLE CONTROL MECHANISM

William F. Groene and Harold J. Siekmann, Cincinnati, Ohio, assignors to The R. K. Le Blond Machine Tool Company, Cincinnati, Ohio, a corporation of Delaware Application April 3, 1941, Serial No. 386,688

8 Claims. (Cl. 82—28)

This invention pertains to spindle control mechanism for machine tools and more particularly to the stopping of rotating work spindles at the completion of a cutting cycle and to provide means for inching or jogging the work spindles when setting the cutting tools. This application involves certain improvements and simplification of mechanisms shown in our Patent #2,192,437 issued March 5, 1940.

The chief object of this present invention is to materially simplify the hydraulic control mechanism and apparatus necessary to provide an arrangement for stopping the work spindle, wherein the advantages of the electric motor for driving the work spindle is preserved but wherein the braking, accurate stopping of the work spindle at a predetermined position, and inching or jogging of the work spindle is effected by hydraulic operating and control means.

Another object to be accomplished by the simplified spindle control mechanism, is that of providing in a machine tool, a means for rotating a work spindle at relatively high speed and a means in connection with said first mentioned means for rotating said work spindle at a predetermined slow speed when said first mentioned means is inoperative and to provide further means in connection with said second mentioned means for stopping said work spindle in a predetermined accurate position when rotating at said low speed.

Another object is to provide in a machine tool. a means for rotating a work spindle at relatively high speed and means in connection with said first mentioned means for slowing said spindle down to and rotating it at a predetermined slow speed when said first mentioned means is inoperative and to provide further means in connection with said second mentioned means for stopping said work spindle in a predetermined accurate position when rotating it at said slow speed.

Another object is to provide in a machine tool a means for rotating a work spindle at relatively high speed and means in connection with said first mentioned means for slowing said spindle down to and rotating it at a predetermined slow speed when said first mentioned means is inoperative and to provide further means in connection with said second mentioned means for intermittently stopping and rotating said work spindle at said predetermined slow speed.

Another object is to provide an electric driving motor for rotating a work spindle and a hydraulic braking motor in connection with said electric motor for arresting rotation of the electric motor and work spindle and to bring them to a stop at a definite predetermined position to facilitate loading and unloading of work in the work spindle.

Another object is also to provide in connection with the work spindle driven by an electric motor, a hydraulic braking motor for jogging said spindle when said electric motor is inoperative.

And still another object is to provide a combination with a work spindle driven by an electric motor, a hydraulic braking motor for slowing down the rotation of the work spindle when the electric motor is rendered inoperative and to constantly rotate said spindle at a predetermined slow speed and at which speed said hydraulic braking motor may be rendered effective to accurately stop the work spindle at a definite predetermined position.

Further objects and advantages of this invention will appear from the detailed description of the drawing:

Figure I is a circuit diagram of the electric-hydraulic operating and control mechanism shown diagrammatically applied to a double center drive lathe.

Figure II is a diagrammatic representation of the electric driving motor, the hydraulic braking motor, and associated transmission mechanism of a typical double center drive lathe to which this invention may be effectively applied.

For purposes of an exemplary disclosure, this invention is shown applied to a double center drive lathe of a character for example as shown in Patent #2,069,107, dated January 26, 1937, a spindle driving arrangement for such a lathe being shown diagrammatically in Figure II comprising the work spindle 1, consisting of a pair of center drive ring gears 2 and 3, which are driven through suitable idler gears 4, by the pinions 5, fixed on the drive shaft 6. The drive shaft 6 is driven by the main drive electric motor 7 which has a pulley 8 mounted on its motor shaft 9, connected by suitable belts 10 to the driving pulley 11 mounted on the pulley shaft 12 upon which shaft is fixed the driving pinion 13 which drives the gear 14 fixed on the drive shaft 6, whereby the motor may rotate the center drive gears 2 and 3. Also connected to the shaft 9 of the motor 7 is the hydraulic braking motor 15, which may be of the usual gear pump or piston pump type.

The supply of fluid pressure for the hydraulic control system may be derived from the usual hydraulic fluid pressure pump 16 driven by an electric motor 17, which draws fluid through the suction line 18 from the fluid reservoir 19 and delivers fluid under pressure through the pressure line 20. Drainage from a relief valve in the pump 16 for maintaining pressure in the line 20 is exhausted through the line 21 into the drain linge 22, which returns fluid to the reservoir 19.

In the operation of the lathe, when the main drive motor 7 is operating driving the work spindle 1 during the cutting operation, the hydraulic braking motor 15 is also being driven by the motor shaft 9. Under these conditions, fluid is discharged from the exhaust port 23 of the hydraulic braking motor 15, through the line 24, freely through the deceleration control valve 25, the line 26 to the control valve 27. The control valve 27 is a three-position valve having a "spring centered" normal position (a) a "brake" or "jog" position (b) effected by operation of its solenoid 28, and a "plug" position (c) effected by operation of its solenoid 29. The effect of these positions of the control valve 27 on the various lines connected to the valve is indicated in Figure I of the drawing and may be tabulated as follows:

(a) Spring centered:
    Line 26 connected to line 30.
    Lines 38 and 40 cut off at valve.
(b) Solenoid 28 energized:
    Line 26 connected to line 40.
    Line 30 connected to line 38 (blocked at check valve 37).
(c) Solenoid 29 energized:
    Line 26 connected to line 38 (blocked at check valve 37).
    Line 30 connected to line 40.

When the main drive motor is operating as above, the control valve 27 is in the spring centered position with both solenoids 28 and 29 de-energized, whereby fluid from the line 26 passes freely through the valve 27 into the line 30, and returns by way of the lines 31, 32 and 33 to the intake port 34 of the fluid pressure motor 15, thus completing a circuit of free fluid circulation. The relief valve 25 is so designed that fluid from the line 32 cannot pass through it to the line 24 or 26 from the discharge line 35 of this valve 25. Also, fluid cannot escape from this circuit through the line 36, the check valve 37 (which is arranged for free flow from line 36 to 38) and the line 38, since the control valve 27 when in spring centered position closes off the line 38. Pressure supply is maintained in this circuit of free circulation from the line 20 connected to the fluid pressure pump 16.

At the completion of the cutting cycle, electric power is cut off from the main drive motor 7 through suitable electrical control apparatus. This renders the limit switch LS—1 effective, so that the first time it is actuated by the dog 39, carried by the ring gear 2 after electric power is cut off from the main drive motor 7, the solenoid 28 of the control valve 27 will be energized thus moving the valve to the brake position. When in this position, the line 26 is connected to the line 40, which in turn is connected to the flow restricting or slow speed control valve 41, discharge from this valve 41 passing into the drain line 22. Line 30 is connected to line 38 which in turn is connected to the check valve 37 and the line 36 connected to the line 31. Thus there is no flow of fluid from the pressure line 20 into lines 30—31 and in the lines 38 and 36 as they are in a closed circuit. Fluid pressure does however, continue to be applied to the line 32 from the line 20. When the solenoid 28 is operated, fluid is exhausted from the port 23 of the hydraulic motor 15 and passes into the slow speed control valve 41, which is capable of allowing only a small amount of fluid to be discharged from the motor to be passed into the drain line 22, resulting in high pressure being built up in the line 24, thus restricting rotation of the hydraulic motor 15. The larger part of this fluid discharge under pressure is passed into the line 35 through the deceleration control valve 25, which discharge recirculates through lines 35 and 33, and the motor 15 while the machine is decelerating to a predetermined slow speed, at which time the pressure in the line 24 drops to the pressure in line 35 and the valve 25 thereby closes with no further discharge into the line 35. Adjustment of the valve 25 thus regulates the rate of deceleration of the machine.

This deceleration process continues until the hydraulic motor has slowed down to the point where the discharge from the port 23 can be completely carried through the slow speed control valve 41, whereupon the motor 15 will continue to operate slowly at this rate of discharge through the valve 41 as it now is driven by the fluid pressure from the hydraulic pump 16, through the lines 20, 31, 32, and 33 connected to the inlet port 34.

Just after the machine has been brought to the slow speed of rotation, a dog 41a on the ring gear 3 engages the limit switch LS—2, which causes the solenoid 29 of the control valve 27 to be energized, thus moving the valve to the plug position. When in this position, the line 26 is connected to the line 38 which is blocked off by the check valve 37 so that no fluid can pass out of the line 38. Thus with the hydraulic motor operating at the predetermined slow speed, its exhaust port is blocked or plugged off bringing the hydraulic motor 15 to a stop, since there is insufficient energy in the machine when thus rotating slowly to effect any discharge through the valve 25 into the line 35. Line 30 is connected to the line 40 which allows the fluid pressure from the line 20 to flow through the slow speed control valve 41 into the drain line 22 at a sufficiently slow rate to maintain the pressure in the line 20. It is to be noted that when thus stopped, fluid pressure from the lines 30—31 is equally applied to each side of the hydraulic motor 15. This pressure is applied to the intake port 34 of the motor 15, through the lines 32 and 33 and to the exhaust port through the line 36, the check valve 37, line 38, control valve 27, line 26, deceleration valve 25, and the line 24. In this way, creeping of the hydraulic motor 15 is avoided, which might otherwise occur if the pressure was allowed to remain only on the intake side of the hydraulic pump 15, since under these conditions the plugged off exhaust circuit would allow the motor 15 to be slowly rotated by fluid pressure entering the port 34.

When it is desired to jog the center drive gears 2 and 3 it is only necessary to provide suitable electrical means for cutting out the limit switches LS—1 and LS—2 and to alternately energize one or the other of the solenoids 28 and 29 of the control valve 27. When the solenoid 28 is energized the center drive gears rotate at a predetermined slow speed and when solenoid 29 is energized the center drive gears are substantially instantly stopped as described above.

Having thus fully set forth and described our invention, what we claim as new and desire to secure by United States Letters Patent is:

1. In a machine tool, a work spindle, a spindle driving motor for rotating said work spindle, a hydraulic braking motor connected to rotate with said spindle and driving motor, a source of fluid pressure, inlet and exhaust ports for said hydraulic braking motor, means interconnecting said ports to permit fluid discharged from said exhaust port to enter said inlet port when said hydraulic motor is being driven by rotation of said spindle and driving motor, and means for applying said source of fluid pressure to said ports during the flow of fluid from the exhaust port to said intake port, a control valve in said interconnecting means for said ports having associated means operable to prevent flow of fluid between said ports to arrest rotation of said hydraulic braking motor, and means in said valve for connecting said source of fluid pressure to a flow restricting valve when said control valve is operated to arrest said flow of fluid between said ports, and means returning discharge from said flow restricting valve to said source of fluid pressure.

2. In a machine tool, a work spindle, a spindle driving motor for rotating said work spindle, a hydraulic braking motor connected to rotate with said spindle and driving motor, a source of fluid pressure, inlet and exhause ports for said hydraulic braking motor, means interconnecting said ports to permit fluid discharged from said exhaust port to enter said inlet port when said hydraulic motor is being driven by rotation of said spindle and driving motor, and means for applying said source of fluid pressure to said ports during the flow of fluid from the exhaust port to said intake port, a control valve in said interconnecting means for said ports having associated means operable to prevent flow of fluid between said ports to arrest rotation of said hydraulic braking motor, and means in said valve for connecting said source of fluid pressure to a flow restricting valve when said control valve is operated to arrest said flow of fluid between said ports, and means returning discharge from said flow restricting valve to said source of fluid pressure, a deceleration control valve interconnected between said hydraulic braking motor and said control valve having means connecting the discharge from said deceleration control valve to the inlet port of said hydraulic braking motor, said deceleration control valve being effective, when said control valve is operated to prevent flow of fluid between said ports of said braking motor, to momentarily permit discharge of fluid under pressure to escape from said exhaust port to said inlet port of said braking motor to cause a deceleration in the speed of rotation of said braking motor in a predetermined interval of time.

3. In a machine tool, a work spindle, a spindle driving motor for rotating said work spindle, a hydraulic braking motor connected to rotate with said spindle and driving motor, a source of fluid pressure, inlet and exhaust ports for said hydraulic braking motor, means interconnecting said ports to permit fluid discharged from said exhaust port to enter said inlet port when said hydraulic motor is being driven by rotation of said spindle and driving motor, and means for applying said source of fluid pressure to said ports during the flow of fluid from the exhaust port to said intake port, a control valve in said interconnecting means for said ports; means rendered effective by the operation of said valve to permit restricted flow of fluid between said ports to reduce the rate of rotation of said hydraulic braking motor to a predetermined slow speed, and means in said valve for connecting said discharge from the exhaust port of said hydraulic braking motor to a flow restricting valve and for disconnecting said source of fluid pressure from said exhaust port of said hydraulic braking motor when said control valve is operated to restrict said flow of fluid between said ports, and means returning discharge from said flow restricting valve to said source of fluid pressure.

4. In a machine tool, a work spindle, a spindle driving motor for rotating said work spindle, a hydraulic braking motor connected to rotate with said spindle and driving motor, a source of fluid pressure, inlet and exhaust ports for said hydraulic braking motor, means interconnecting said ports to permit fluid discharged from said exhaust port to enter said inlet port when said hydraulic motor is being driven by rotation of said spindle and driving motor, and means for applying said source of fluid pressure to said ports during the flow of fluid from the exhaust port to said intake port, a control valve in said interconnecting means for said ports, a check valve associated with said control valve, means for actuating said control valve to connect discharge from said exhaust port of said hydraulic braking motor in non-flow direction to said check valve to arrest rotation of said braking motor.

5. In a machine tool, a work spindle, a spindle driving motor for rotating said work spindle, a hydraulic braking motor connected to rotate with said spindle and driving motor, a source of fluid pressure, inlet and exhaust ports for said hydraulic braking motor, means interconnecting said ports to permit fluid discharged from said exhaust port to enter said inlet port when said hydraulic motor is being driven by rotation of said spindle and driving motor, and means for applying said source of fluid pressure to said ports during the flow of fluid from the exhaust port to said intake port, a control valve in said interconnecting means for said ports, a check valve associated with said control valve, means for actuating said control valve to connect discharge from said exhaust port of said hydraulic braking motor in non-flow direction to said check valve to arrest rotation of said braking motor, and means whereby said check valve automatically permits application of said source of fluid pressure to both of said ports of the hydraulic braking motor when said hydraulic braking motor has stopped rotating.

6. In a machine tool, a work spindle, a spindle driving motor for rotating said work spindle, a hydraulic braking motor connected to rotate with said spindle and driving motor, a source of fluid pressure, inlet and exhaust ports for said hydraulic braking motor, means interconnecting said ports to permit fluid discharged from said exhaust port to enter said inlet port when said hydraulic motor is being driven by rotation of said spindle and driving motor, and means for applying said source of fluid pressure to said ports during the flow of fluid from the exhaust port to said intake port, a control valve in said interconnecting means for said ports having associated means operable to prevent flow of fluid between said ports to arrest rotation of said hydraulic braking motor, and means in said valve for connecting said source of fluid pressure to a flow restricting valve when said control valve is operated to arrest said flow of fluid between said ports, and means returning discharge from said flow restricting valve to said source of fluid pressure, and means actuated by the rotation of said spindle and driving motor to render said control valve operative.

7. In a machine tool, a work spindle, a spindle driving motor for rotating said work spindle, a hydraulic braking motor connected to rotate with said spindle and driving motor, a source of fluid pressure, inlet and exhaust ports for said hydraulic braking motor, means interconnecting said ports to permit fluid discharged from said exhaust port to enter said inlet port when said hydraulic motor is being driven by rotation of said spindle and driving motor, and means for applying said source of fluid pressure to said ports during the flow of fluid from the exhaust port to said intake port, a control valve in said interconnecting means for said ports; means rendered effective by the operation of said valve to permit restricted flow of fluid between said ports to reduce the rate of rotation of said hydraulic braking motor to a predetermined slow speed, and means in said valve for connecting said discharge from the exhaust port of said hydraulic braking motor to a flow restricting valve and for disconnecting said source of fluid pressure from said exhaust port of said hydraulic braking motor when said control valve is operated to restrict said flow of fluid between said ports, and means returning discharge from said flow restricting valve to said source of fluid pressure, and means actuated by the rotation of said spindle and driving motor to render said control valve operative.

8. In a machine tool, a work spindle, a spindle driving motor for rotating said work spindle, a hydraulic braking motor connected to rotate with said spindle and driving motor, a source of fluid pressure, inlet and exhaust ports for said hydraulic braking motor, means interconnecting said ports to permit fluid discharged from said exhaust port to enter said inlet port when said hydraulic motor is being driven by rotation of said spindle and driving motor, and means for applying said source of fluid pressure to said ports during the flow of fluid from the exhaust port to said intake port, a control valve in said interconnecting means for said ports, means in said valve for connecting said discharge from the exhaust port of said hydraulic braking motor to a flow restricting valve and for disconnecting said source of fluid pressure from said exhaust port of said hydraulic braking motor when said control valve is operated to restrict said flow of fluid between said ports, and means returning discharge from said flow restricting valve to said source of fluid pressure, and a deceleration control valve interconnected between said hydraulic braking motor and said control valve, and means connecting the discharge from said deceleration control valve to the inlet port of said hydraulic braking motor to permit limited flow of fluid between said ports.

WILLIAM F. GROENE.
HAROLD J. SIEKMANN.